(12) United States Patent
Wetch et al.

(10) Patent No.: US 8,790,090 B2
(45) Date of Patent: Jul. 29, 2014

(54) PRIMING OF GEAR PUMP IN ALTERNATIVE ATTITUDES

(75) Inventors: Joseph Wetch, Roscoe, IL (US); Sara Dexter, Rockford, IL (US); Charles E. Reuter, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 298 days.

(21) Appl. No.: 13/190,548

(22) Filed: Jul. 26, 2011

(65) Prior Publication Data

US 2013/0028752 A1    Jan. 31, 2013

(51) Int. Cl.
F04B 23/12    (2006.01)

(52) U.S. Cl.
USPC .......................................... 417/79; 417/410.4

(58) Field of Classification Search
USPC ................ 417/410.4, 79, 199.1; 418/180, 15, 418/206.1, 206.4; 123/495, 506, 446, 447
See application file for complete search history.

(56) References Cited

U.S. PATENT DOCUMENTS

| | | | |
|---|---|---|---|
| 3,280,756 A | 10/1966 | Gordon | |
| 3,526,470 A | 9/1970 | Swanson | |
| 4,033,706 A * | 7/1977 | Schaefer et al. | ................ 417/79 |
| 4,090,820 A | 5/1978 | Teruyama | |
| 4,097,206 A | 6/1978 | Schonherr | |
| 4,480,970 A | 11/1984 | Smith | |
| 6,666,015 B2 | 12/2003 | Dyer | |
| 7,094,042 B1 | 8/2006 | Borgetti et al. | |
| 7,810,309 B2 | 10/2010 | Parsons et al. | |
| 7,878,781 B2 | 2/2011 | Elder | |
| 2009/0041594 A1 | 2/2009 | Yokoi et al. | |

FOREIGN PATENT DOCUMENTS

| | | |
|---|---|---|
| DE | 4441259 A | 5/1996 |
| GB | 24326531 A | 5/2007 |

* cited by examiner

Primary Examiner — Bryan Lettman
(74) Attorney, Agent, or Firm — Carlson, Gaskey & Olds, PC

(57) ABSTRACT

A gear pump has a pair of meshed gears for rotating within a gear pump chamber, and a motor driving at least one of the gears. A discharge line passes fluid downstream from the gear pump chamber, and a suction line delivers fluid into the gear pump chamber. A bypass valve communicates with the discharge line. A shutoff valve communicates with the discharge line. The bypass valve opens at a lower pressure than the shutoff valve. A bypass line communicating the discharge line to the suction line when the bypass valve is open. The gear pump is configured to compress air. In addition, a gear pump arrangement that can be mounted in either of two attitudes is described, as is a method of operating a gear pump.

3 Claims, 1 Drawing Sheet

PRIMING OF GEAR PUMP IN ALTERNATIVE ATTITUDES

BACKGROUND

This application relates to a gear pump which may be mounted in distinct attitudes, and still be capable of being primed.

Gear pumps are often utilized in fuel pumping systems for aerospace applications such as airplanes or helicopters. In a typical gear pump, a pair of gears mesh, and move a fluid from an inlet to a discharge line. A bypass line may be provided to bypass discharge fluid back to the inlet.

At startup, there is often air intermixed with the fluid, and priming must occur. In addition, in some applications, there may be a good deal of "lift" or distance through which the fluid must be raised to reach a suction line for the gear pump.

In at least one use for gear pumps, a single gear pump must be mounted in distinct attitudes to reduce the number of gear pump designs that are required to provide fuel pumping for all such systems.

SUMMARY

A gear pump has a pair of meshed gears for rotating within a gear pump chamber. A motor or gearbox drives at least one of the gears. A discharge line passes fluid downstream from the gear pump chamber, and a suction line delivers fluid into the gear pump chamber. A bypass valve communicates with the discharge line. A shutoff valve also communicates with the discharge line. The bypass valve opens at a lower pressure than the shutoff valve. A bypass line communicates the discharge line to the suction line when the bypass valve is open. The gear pump is configured to compress air in addition to pumping fluid.

In addition, a gear pump arrangement that can be mounted in either of two attitudes is disclosed, as is a method of operating a gear pump.

These and other features of the present invention can be best understood from the following specification and drawings, of which the following is a brief description.

DETAILED DESCRIPTION

Figure 1:
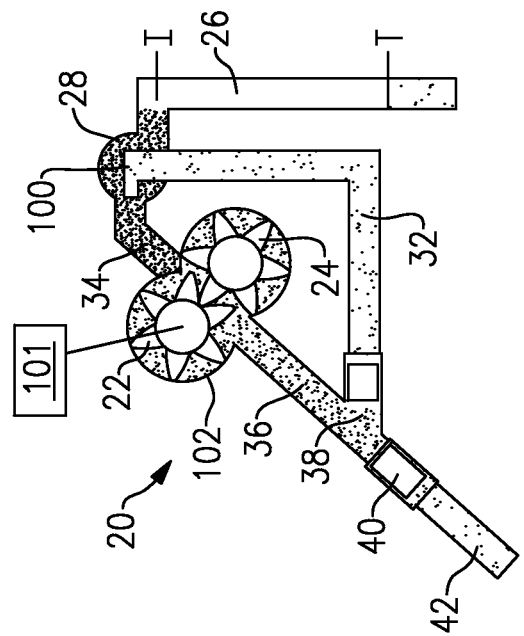
FIG. 1 shows a gear pump in a first position.

As shown in FIG. 1, gear pump system 20 includes gears 22 and 24, as known. Motor 101 drives one of the gears 22/24 to rotate in pump chamber 102, as known. The gears are positioned to move a fluid through a relatively high amount of "lift" as shown at 26. In one application there may be as much as 6' (1.82 m) of lift. As can be seen, the lift is a plumbing requirement for one application of the system wherein the fuel level in the tank is at a point T, and the fuel must be drawn vertically upwardly through the lift to be drawn into an ejector pump 28 at point I. The application may be for use in a helicopter, as an example.

From the inlet line 26, the fluid passes through an ejector pump 28, and then into a suction line 34. The ejector pump 28 also includes a screen (not shown). As can be appreciated, during normal operation a nozzle 100 receives pressurized fluid from a bypass line 32, which when driven into the ejector pump chamber, draws the fluid from inlet line 26 upwardly through the lift. Fluid from suction line 34 is driven by pump gears 22/24 into a discharge line 36, and is stopped by a shutoff valve 40 from reaching a final outlet 42 until a high pressure is built up. The shutoff valve 40 may require, for example, 200 psi (1340 Kpa) to open. A bypass valve 38 is positioned to selectively control the flow of fluid from the discharge line 36 into the bypass line 32, and back to the ejector pump 28. At startup, there may be air mixed into this fluid. The bypass valve 38 opens at a relatively low pressure, for example 50 psi (345 Kpa).

Prior to priming start up, the fluid cavities above the level of point I will drain back to the fuel tank and contain air excluding the discharge line 36, where liquid is trapped by the gears and does not drain. At priming startup, a mixture of fluid and air fluid passes through the gears 22 and 24, into the discharge line 36, opens the bypass valve 38 at a relatively low pressure, and is returned through the bypass line 32 to the ejector pump 28. As this air is compressed in the discharge line, a volume of air is drawn up through the inlet line. As more air is compressed in the discharge line, more air is drawn up the inlet line. Eventually air is drawn up from the inlet line and fluid reaches the gear pump. At this point, sufficient pressure can be generated to open the shutoff valve 40.

The fluid can then pass through the outlet 42. In this way, the air is purged soon after startup. The bypass valve 38 remains open, driving fuel through the ejector pump 28.

Figure 2:
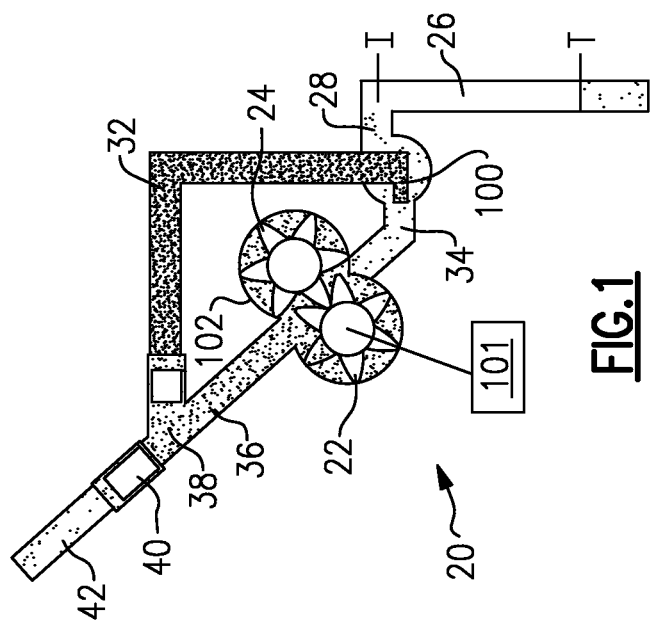
FIG. 2 shows the gear pump in an inverted alternative position.

FIG. 2 shows a requirement of some modern applications. The pump 20 is mounted in an inverted attitude. This is not the result of flight maneuvering, but rather, a plumbing requirement for some applications. As shown, the ejector pump 28, and the suction 34 are now vertically above point I.

As can be appreciated, in the FIG. 1 attitude, the air is, for the most part, in the bypass line 32 initially, and thus is driven by fluid and intermixed air back downwardly through the nozzle 100 as the pump starts up. In the FIG. 2 attitude, however, the air will be generally sitting within the ejector pump 28. The volume of air in the bypass line 32 for the FIG. 1 attitude and in the ejector pump 28 for the FIG. 2 attitude above point I is greater than the volume of air in the inlet line 26 between point I and point T. Thus, the fluid in the bypass line 32 must initially entrain and drive that air into the gear pump chambers.

In the FIG. 1 attitude, the bypass line 32 is generally above the point I, whereas in the FIG. 2 attitude, the bypass line 32 is generally below the point I and the ejector pump 28 is above point I. Also, as can be seen in FIG. 1, the suction line 34 is vertically below the discharge line 36. In FIG. 2, the suction line 34 is above the discharge line 36.

One feature that is included in the design or configuration of the gear pump is that there should be complete tooth sealing between the gears 22 and 24, and the gear pump chamber 102 such that air can be compressed in any attitude. Features such as pressure balancing grooves on associated bearings, which may sometimes be utilized in gear pumps to equalize pressure across the gears, would typically not be utilized in this particular embodiment due to the inherent leak path that would exist for priming in one of the attitudes.

Although an embodiment of this invention has been disclosed, a worker of ordinary skill in the art would recognize that certain modifications will come within the scope of this invention. For that reason, the following claims should be studied to determine the true scope and content of this invention.

What is claimed is:

1. A gear pump comprising:

at least a pair of meshed gears for rotating within a gear pump chamber, and a motor driving at least one of the gears;

a discharge line for receiving fluid downstream from said gear pump chamber, and a suction line for delivering fluid into the gear pump chamber;

a bypass valve communicating with said discharge line, and a shutoff valve communicating with said discharge line, said bypass valve opening at a lower pressure than said shutoff valve, and a bypass line communicating the discharge line to the suction line when said bypass valve is open, said shutoff valve opening only when a high pressure is built up on said discharge line;

the gear pump being configured to compress air;

the suction line may be mounted in either of two attitudes, with the suction line being below the discharge line in one attitude and above the discharge line in a second attitude;

a volume of air in an inlet line to be moved by the gear pump is received from a source at a location vertically beneath the suction line in either of the two attitudes; and said bypass line delivers fluid into the suction line through an ejector pump nozzle, with the ejector pump nozzle entraining fluid from the inlet line downstream into the suction line in both attitudes.

2. A method of priming a gear pump comprising the steps of:

delivering fluid to be pumped into a suction line;

driving a pair of pump gears to move the fluid from said suction line into a discharge line;

positioning a bypass valve on the discharge line to open at a first low pressure, and a shutoff valve positioned to block flow of the fluid in the discharge line downstream to an outlet until a second, higher pressure is reached in the discharge line;

passing fluid into the bypass line back to the suction line, and said pump gears compressing air intermixed with the fluid;

fluid in the bypass line drawing additional air from an inlet line such that the amount of fluid being moved into the discharge line, through the bypass line, and back to the suction line continues to increase until air is evacuated from the inlet line and the second higher pressure is reached; and the gear pump may be mounted in either of two orientations, and in a first orientation the suction line positioned below the discharge line, and in the second orientation, the suction line positioned vertically above the discharge line such that fluid in the bypass line must move upwardly into the suction line.

3. A gear pump comprising:

at least a pair of meshed gears for rotating within a gear pump chamber, and a motor driving at least one of the gears;

a discharge line for receiving fluid downstream from said gear pump chamber, and a suction line for delivering fluid into the gear pump chamber;

a bypass valve communicating with said discharge line, and a shut-off valve communicating with said discharge line, said bypass valve opening at a lower pressure than said shut-off valve, and a bypass line communicating the discharge line to the suction line when said bypass valve is open, said shutoff valve opening only when a high pressure is built up on said discharge line;

said gear pump being positioned in either of one of two attitudes when installed, with a first of said attitudes including the suction line positioned vertically below the discharge line, and the suction line being positioned vertically above said discharge line in a second attitude;

said gear pump being provided with gear tooth sealing on the gear pump chamber such that there are no bearing pressure equalization grooves, and the gear pump can effectively compress air when mounted in either of said two attitudes;

an inlet line is connected to deliver fuel to the suction line, and the inlet line being located vertically below the suction line;

a fluid to be moved by the gear pump is received from a source at a location vertically beneath the bypass line in either of the two attitudes, but the fluid is delivered to a point vertically above the bypass line in the second of the two attitudes; and said bypass line delivers fluid into an ejector pump nozzle, with the ejector pump nozzle entraining fluid from the inlet line downstream into the suction line in both attitudes.

* * * * *